9809X

J. S. EASTMAN.

Cnltivator-Teeth.

Patented June 30, 1836.

N. PETERS, PHOTO-LITHOGRAPHER, WASHINGTON, D. C.

June 30, 1836 33

9809X

Jonathan S. Eastman of the City of Baltimore, Maryland

Letters Patent

The schedule referred to in these Letters Patent and making a part of the same containing a description in the words of the said Jonathan S. Eastman himself of his improvement in the Cultivator for Corn and other crops seeding grain &c, To all to whom these presents shall come.

Figure 1:
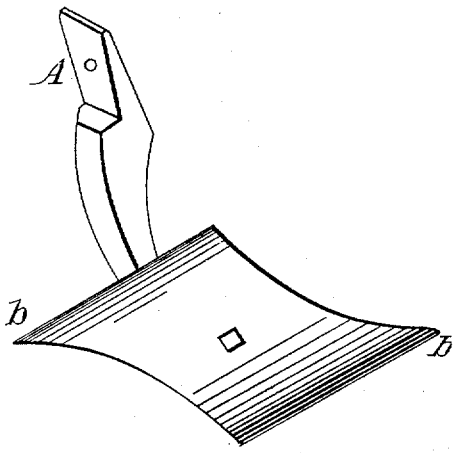
Figure 2:
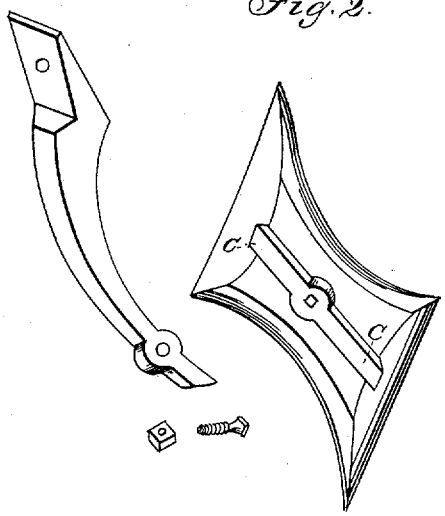

Be it known that I Jonathan S. Eastman of the City of Baltimore & State of Maryland have invented a new and useful improvement in the improved cultivator for corn and other crops, seeding grain &c, and that the following is a full and exact description thereof. Fig 1 Represents a leg and share of a cast iron cultivator. At a, is represented a shoulder on the leg which fits under the bottom and front of the frame being secured to the frame by a bolt and nut, the curve of the leg must be suited to the form of the frame so as to keep the point of the share in a straight forward direction — Fig 2. represents the leg and share detached from each other, the share being turned over to show the manner of its connection with the leg The groove c,c, in the back of the share is exactly addapted to the form of the leg when either point of the share is placed forward I have seen two different [illegible] Cultivators for reversing the shares or points of the shares, each of which had a wrought iron leg to which was attached a cast iron share by means of a dovetailed groove cast in the share and the leg [illegible] to fit the groove without the use of a bolt, But the great difficulty attending the construction of them, so as to make them fit and the insufficiency of them when so made must render it impossible that the instrument by such a construction can

9809X be brought into sufficient use. My object and endeavour has been to simplify the construction and at the same time to render the instrument more permanent both of which objects I have satisfied myself, I have obtained in my improved cultivator.

I claim first the construction of the leg or shank and the manner of fastening it to the wood or frame Secondly, the manner of attaching the share to the leg, by means of the straight groove & bolt as shown in the drawing.

Jonathan G. Eastman

Witnesses
John W. Post,
W. Turner.

Drawing 518 wds

Exd W.H.C.